United States Patent [19]

Slagel

[11] 4,404,353
[45] Sep. 13, 1983

[54] URETHANE ELASTOMER FOR PRINTING BELTS AND PROCESS THEREFOR

[75] Inventor: Edwin C. Slagel, Simi Valley, Calif.

[73] Assignee: Dataproducts Corporation, Woodland Hills, Calif.

[21] Appl. No.: 294,716

[22] Filed: Aug. 20, 1981

[51] Int. Cl.³ ............... C08G 18/42; C08G 18/76; C08G 18/32
[52] U.S. Cl. ............................ 528/67; 528/64
[58] Field of Search .......................... 528/64, 67

[56] References Cited

U.S. PATENT DOCUMENTS

| | | | |
|---|---|---|---|
| 3,034,791 | 5/1962 | Gallagher | 528/63 |
| 3,217,024 | 11/1965 | Park et al. | 528/44 |
| 3,316,285 | 4/1967 | Cleveland | 528/44 |
| 3,454,505 | 7/1969 | Cross | 521/160 |
| 3,471,445 | 10/1969 | Carr | 528/64 |
| 3,629,168 | 12/1971 | Ryan | 528/64 |
| 3,932,360 | 1/1976 | Cerankowski et al. | 528/64 |
| 4,017,464 | 4/1977 | Kimball | 528/64 |
| 4,089,822 | 5/1978 | Vial et al. | 524/378 |
| 4,107,102 | 8/1978 | Dahm et al. | 521/163 |
| 4,125,522 | 11/1978 | Becker | 528/61 |
| 4,129,741 | 12/1978 | Schmidt et al. | 528/67 |
| 4,239,879 | 12/1980 | Fabris et al. | 528/76 |
| 4,293,680 | 10/1981 | Mazanek et al. | 528/67 |
| 4,294,934 | 10/1981 | Grogler et al. | 521/160 |

OTHER PUBLICATIONS

"Influence of the Ratio of the Isomers 2,4 and 2,6 TDI on the Viscosity of the Reaction System in the Synthesis of Polyurethanes Foam", by Sosnyagov; Institute Sint. Smol., U.S.S.R., Sint., Fiz.—KHIM—LIM. (1975), 17, 112–114, (Russ.).

"Investigation of the Influence of the Isomeric Composition of TDI on the Properties of Cast Polyurethanes Produced from it", by I. N. Moriana et al., (NaUCH-NO—ISS. LED., INST. SHINNOI., PROM. Moscow, U.S.S.R., (Cauch., Resina, 1974), (10), 12–13, (Russ.).

Primary Examiner—H. S. Cockeram
Attorney, Agent, or Firm—Spensley, Horn, Jubas & Lubitz

[57] ABSTRACT

A process for making an elastomer for use in printing/drive belts is disclosed wherein a mixture of approximately 2 equivalents of toluene diisocyanate consisting of about 88 wt. % of the 2,4 isomer and 12 wt. % of the 2,6 isomer is reacted with a polyether or polyester having difunctional primary hydroxyl groups to form a prepolymer. The prepolymer is then reacted with a diamine curing agent to form the elastomer.

20 Claims, No Drawings

URETHANE ELASTOMER FOR PRINTING BELTS AND PROCESS THEREFOR

BACKGROUND OF THE INVENTION

1. Field of the Invention

This invention relates to an improved process for making an elastomer for use in manufacturing printing belts for use in band printers, and a prepolymer used in the process.

2. Description of the Prior Art

In band printers, a great deal of stress is applied to the drive band or belt. It is therefore necessary that the band be made of a strong, durable material which is also flexible.

In particular, for such a belt, or any type belt some of the most important properties are flex life, tear resistance, cut tear propagation, low to medium tensile modulus and an "A" durometer of about 90. In the past, in order to achieve good flex and tear properties, other properties were degraded. The result is a greater likelihood of breakage in strenuous use and hostile environments.

One of the more successful prior art compositions heretofore used has been Adiprene L-100, a polytetramethylene ether glycol ("PTMEG") reacted with, 4, 4'methylene-bis-(2-chloroaniline) ("MOCA") which produces an elastomer. Both the PTMEG and MOCA are commercially available products. However, this reaction product has two significant disadvantages. One disadvantage is that the typical service life of the Adiprene L-100/MOCA band is about 6000 hours. The other disadvantage is that it has been found that MOCA is a likely carcinogen. It may therefore be undesirable to continue working with MOCA-cured elastomers.

A substitute elastomer which has been used is a urethane elastomer from the Hysol Division of Dexter Corporation designated RU 2028/HDO 121. RU 2028 is also a PTMEG and HDO 121 is a dianthranilic diester. These components, i.e., the RU 2028 HDO 121, are reacted together to produce the substituted elastomer. However, bands manufactured from this elastomer did not have the necessary strength for use as printing belts in band printers.

It is believed that there are currently no compositions available which exhibit superior processing parameters and properties to the Adiprene L-100/MOCA composition, and are cost effective to produce.

SUMMARY OF THE INVENTION

It is therefore an object of the present invention to provide a process for making relatively low cost, strong, durable, urethane elastomer compositions for use in the manufacturing of printing belts.

The process of the present invention consists of preparing a prepolymer and reacting the prepolymer with a specific diamine curing agent such as trimethylene glycol di-p-aminobenzoate (POLACURE 740M) a product of the Polaroid Corporation.

The prepolymer is formed by reacting, in specific proportions, toluene diisocyanate ("TDI") with a polyether having difunctional primary hydroxyl groups such as PTMEG. Preferably, the TDI is a mixture of the 2,4 isomer with the 2,6 isomer. The ratio of 2,4 to 2,6 is 88/12. This ratio is different from the standard ratio of 80/20 or 65/35 both of which are commercially available. It has been found that the adjusted ratio gave an improvement in processing properties while maintaining excellent physical properties of the final product. It is believed that both the process for making the prepolymer as well as the prepolymer itself are new, especially when the prepolymer is reacted with trimethylene glycol di-p-aminobenzoate for making an elastomer for use in printing belts.

The TDI mixture is mixed in approximately a 2:1 ratio with the PTMEG glycol. The mixture is then heated and reacts to form a prepolymer. This prepolymer is then reacted with a diamine curing agent to form the final product. The final product exhibits physical properties superior to the prior art Adiprene L-100/MOCA composition as well as other prior art compositions. In particular, band printers have been operated using bands of the instant composition for over 20,000 hours without a failure.

The novel features which are believed to be characteristic of the invention, together with further objectives and advantages thereof, will be better understood from the following description in which a presently preferred embodiment of the invention is illustrated by way of example. It is to be understood that the specific examples are for purposes of illustration only and are not intended as a definition of the limits of the inventions.

DETAILED DESCRIPTION OF THE INVENTION

The process of the present invention relates to the reaction of a diamine curing agent with a polyether or polyester prepolymer. The curing agent preferably used is sold by the Polaroid Corporation under the trademark "Polacure 740M." This curing agent is a diamine which is off white to light tan in color and has a melting point of 257° F. to 262.4° F. It has a formula as follows:

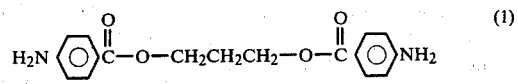

(1)

Diamines having 2 to 6 carbon atoms in the "bridge" between the oxygen atoms are also within the scope of this invention.

The prepolymer used in the process of the present invention is the reaction product of a TDI mixture and a polyether or a saturated or unsaturated polyester containing only difunctional primary hydroxyl groups; for example PTMEG. The TDI mixture preferably comprises an 88/12 ratio of the 2,4 and 2,6 isomers, respectively, of TDI for the polyether prepolymers with a usable range of about 88/12 to 94/6. For the polyester prepolymers, the preferred isomer ratio of TDI is 65 to 75% of the 2,4 and 35 to 25% of the 2,6. The TDI 2,4 and 2,6 compounds are shown below.

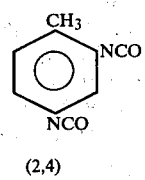

(2,4)

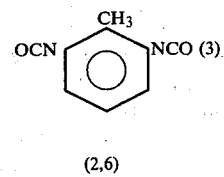

(2,6)

This specific mixture of TDI is not believed to be commercially available. However, the pure 2,4 isomer is commercially available, as well as a mixture in the ratio of 80/20. Therefore, in order to obtain the appropriate 88/12 ratio, 1.2 equivalents of the 80/20 mixture is mixed with 0.8 equivalents of the pure 2,4 mixture. This ratio may be varied slightly while retaining most of the beneficial properties. It has been found that the percentage of 2,4 isomer may vary between 84 and 96% with 88% being preferred.

This 88/12 TDI mixture is first reacted with the PTMEG in a 2 to 1 ratio. PTMEG has the following formula:

HO—CH$_2$CH$_2$CH$_2$CH$_2$—O—[CH$_2$CH$_2$CH$_2$CH$_2$—O—]$_n$CH$_2$CH$_2$CH$_2$CH$_2$OH  (4)

where n is selected such that the molecular weight of the prepolymer shown below is about 500 to 4,000 with the preferred weight being about 2,000.

The following specific procedure has been used to prepare the prepolymer of the present invention. The 88/12 mixture of TDI is added to a reactor. The reactor is free from contamination and is equipped with heating, cooling agitation, dry N$_2$ and vacuum. The temperature of the TDI mixture is between 70° F. and 80° F. The agitator is started and the reactor is purged with dry N$_2$. The mixture is then heated to 100° F. and the PTMEG is rapidly added. The PTMEG has been preheated to 115°–120° F. The ratio of the TDI mixture to the PTMEG is selected to be within the range of between 1.5 and 2.5 to 1.

The total mixture is then heated to 184°–187° F. at a rate of approximately 2° F. per minute. The mixture is allowed to react at that temperature for a period of 12 to 15 minutes and is slowly cooled to 145°–150° F. The product may then be stored in containers which have been purged with dry N$_2$ at a temperature of between 65° and 75° F.

The resulting PTMEG/(2,4) TDI prepolymer can be represented by the formula below.

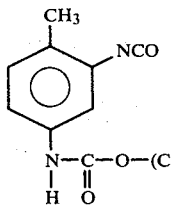 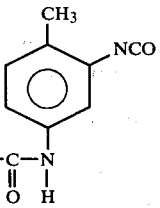

where n is as defined above for formula 4.

It is believed that the prepolymer shown above is novel and has not heretofore been used in the manufacture of an elastomer for use in a printing belt. The 2,6 TDI is not believed to react with the PTMEG in any appreciable amount and so is available for reaction with the diamine.

This mixture of prepolymer and the free 2,6 TDI is then reacted with POLACURE 740M (see formula 1 above). The prepolymer, free 2,6 TDI and the curing agent are mixed together in approximately a stoichiometry of from 0.7 NH$_2$ groups to 1 NCO group to 1.2 NH$_2$ groups to 1 NCO group with the range of 0.8 to 1.0 NH$_2$ groups being preferred. In determining the stoichiometry, the NCO groups of both the propolymer and the 2,6 TDI are considered with respect to the NH$_2$ groups of the diamine.

The prepolymer at a temperature of approximately 170° F. is mixed with the curing agent which is at a temperature of approximately 280° F. The two are thoroughly mixed. The mixture is then evacuated at 0.5 to 1.0 millimeters of Hg until only a few bubbles are breaking on the surface (or bubble free). The mixture is then put into a mold at a temperature of approximately 216° F. and cured for approximately 8 hours at that temperature. The curing temperature can be varied from 160° F. to 300° F. with 180° F. to 220° F. being preferred. The curing time can also be varied from 1 to 16 hours. The finished product can then be removed from the mold and conditioned 7 days at room temperature before use.

It is believed that the resulting elastomer has the formula:

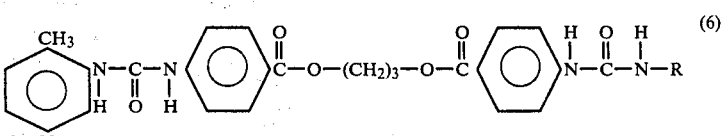

where R is the PTMEG/TDI prepolymer showing one of its NCO groups reacted with the NH$_2$ group from the Polacure 740M diamine curing agent.

The reaction product of the 2,6 TDI and the diamine has the formula:

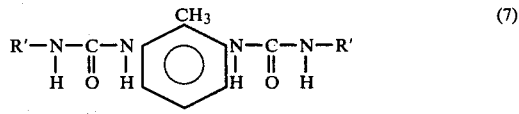

where R' is the POLACURE 740M diamine showing one of its NH$_2$ groups reacted with the NCO groups from the 2,6 TDI.

It is also believed that the free NH$_2$ groups of the 2,6 TDI/diamine reaction product shown in formula 7 also react with NCO groups on the PTMEG/TDI prepolymer just as does the free diamine. The resulting polymer is a combination of long chain (PTMEG/TDI/diamine) groups and short chain (2,6 TDI/diamine) groups scattered throughout the final polymer. The lengths of the polymer chains are limited by the stoichiometry.

For belt manufacture, the most important properties are flex life, tear resistance, cut tear propagation with low to medium tensile modulus and an "A" durometer of approximately 90. The product of the process of the present invention combines outstanding flex and tear resistance with excellent physical properties and hydrolytic stability. For example, the urethane elastomers of the present invention have a Shore "A" of approximately 90, but still have a tensile strength in excess of 8,000 psi, a split tear strength of 300 pli or greater, outstanding cut-tear propagation, and a flex life (Ross flex) wherein after $100 \times 10^6$ flexes, there were still no changes in the sample. Various tests according to methods well known in the art were performed on the product made as described above and compared with the previously used Adiprene L-100/MOCA composition. The results of these tests can be found in Table 1.

TABLE 1

| Test | Adiprene L-100/MOCA | Present Invention |
|---|---|---|
| Percent theory | 100 | 100 |
| Hardness, durometer A | 90 | 90 |
| 100% Modulus, psi | 1,100 | 840 |
| 300% Modulus, psi | 1,700 | 1,350 |
| Tensile Strength, psi | 4,000 | 8,265 |
| Elongation at break, % | 500 | 650 |
| Tear Strength, Die C | 490 | 530 |
| Tear Strength, split | 70 | 321 |
| Ross Flex No. To 5×* | $30 \times 10^4$ | $>100 \times 10^6$ no propagation from original 0.100 inch cut |

*A .100 inch cut is introduced into the middle of a 1.0 inch wide × .125 inch thick sample. When propagation reaches 0.5 inches (5×) failure has occurred.

As can be seen from Table 1, the properties of the composition resulting from the process of the present invention all meet or exceed those of the prior art composition. As noted above, the useful life of a belt made according to the process of the present invention has been shown to exceed 20,000 hours whereas the average life of the prior art composition was 6,000 hours.

Equivalent tests are also performed with respect to the Hysol RU 2028/HDO 12, elastomer. A comparison of the properties of this prior art compound with the compound made according to the present invention can be found in Table 2.

TABLE 2

| Test | Hysol | Present Invention |
|---|---|---|
| Percent theory | 100 | 100 |
| Hardness, durometer A | 93 | 90 |
| 100% Modulus, psi | 853 | 840 |
| 300% Modulus, psi | 2,293 | 1,350 |
| Tensile Strength, psi | 3,450 | 8,265 |
| Elongation at break, % | 325 | 650 |
| Tear Strength, Die C | 213 | 530 |
| Tear Strength, split | 93 | 321 |
| Ross Flex No. To 5×* | 1,950 | $>100 \times 10^6$ no propagation from original 0.100 inch cut |

Numerous other tests were performed using the process of the present invention including varying the parameters of the process itself. One test was made in which the stoichiometry of the prepolymer-curing agent reaction was varied. The results of this test are given in Table 3. The percentages given are the equivalent percents of the $NH_2$ groups of the diamine curing agent with respect to the NCO groups of the prepolymer and the free 2,6 TDI. All other parameters are the same as described above with respect to the preferred embodiment.

TABLE 3

| | 80% | 85% | 90% | 95% | 100% |
|---|---|---|---|---|---|
| Hardness, durometer A | 92 | 91 | 91 | 90 | 90 |
| 100% Modulus, psi | 1,050 | 1,159 | 1,143 | 1,143 | 1,070 |
| 300% Modulus, psi | 1,710 | 1,681 | 1,543 | 1,436 | 1,350 |
| Tensile Strength, psi | 5,785 | 6,899 | 7,480 | 8,870 | 8,265 |
| Elongation at break, % | 525 | 525 | 560 | 625 | 650 |
| Tear Strength, Die C | 425 | 460 | 470 | 500 | 530 |
| Tear Strength, split | 80 | 116 | 143 | 200 | 321 |
| Ross Flex No. To 5× | — | — | $30 \times 10^4$ | — | $>100 \times 10^6$ no propagation from original 0.100 inch cut |

As can be seen from Table 3, even at only 80% stoichiometry, most of the physical properties of the product of the present invention meet or exceed the properties of the prior art compounds. At 95% stoichiometry, the superiority is clear. This ability to reduce the amount of curing agent used is important due to its high cost.

Similar stoichiometry tests were performed wherein the original ratio of 2,4 to 2,6 TDI was varied. In Table 4, are compiled the results of the testing where the ratio of the 2,4 to 2,6 isomers is 86 to 14 rather than 88 to 12. The percentages indicated are the same as for Table 3. All other parameters are the same as described above with respect to the preferred embodiment.

TABLE 4

| | 80% | 85% | 90% | 95% | 100% |
|---|---|---|---|---|---|
| Hardness, durometer A | 93 | 92 | 92 | 92 | 92 |
| 100% Modulus, psi | 685 | 1,029 | 1,029 | 1,029 | 914 |
| 300% Modulus, psi | 1,429 | 1,943 | 1,829 | 1,829 | 1,600 |
| Tensile Strength, psi | 5,486 | 6,543 | 8,343 | 8,543 | 9,086 |
| Elongation at break, % | 475 | 500 | 525 | 550 | 650 |
| Tear Strength, Die C | 510 | 525 | 540 | 545 | 545 |
| Tear Strength, split | 50 | 100 | 136 | 157 | 325 |
| Ross Flex No. To 5× | — | — | — | — | $>40 \times 10^6$ |

The results in Table 4 demonstrate that an excellent balance of properties were achieved using an isomer ratio of 84:16.

Tests were also made on the effect of varying the molecular weight of the PTMEG/TDI prepolymer. Keeping all other parameters constant and using a TDI isomer ratio of 88:12, the properties were measured of the products wherein the molecular weight of the PTMEG/TDI prepolymer was approximately 1000 as well as tests using a 50:50 mixture by weight of 1000 and 2000 molecular weight prepolymer. The values thus obtained are compared with the product of the preferred embodiment, where the molecular weight of the prepolymer is approximately 2000, below in Table 5. The stoichiometries of curing agent to prepolymer for these tests were all 100%.

TABLE 5

| | 1000 | 50:50 1000/2000 | 2000 |
|---|---|---|---|
| Hardness, durometer A | 98 | 95 | 90 |
| 100% Modulus, psi | 1,500 | 1,100 | 840 |
| 300% Modulus, psi | 2,500 | 1,750 | 1,350 |
| Tensile Strength, psi | 7,200 | 8,400 | 8,265 |
| Elongation at break, % | 550 | 600 | 650 |
| Tear Strength, Die C | 660 | 560 | 530 |
| Tear Strength, split | 525 | 360 | 321 |

TABLE 5-continued

|  | 1000 | 50:50 1000/2000 | 2000 |
|---|---|---|---|
| Ross Flex No. To 5× | 30 × 10³ | >30 × 10⁵ | >100 × 10⁶ |

As can be seen, the best balancing of properties was obtained using the 2000 molecular weight prepolymer of the PTMEG/TDI reaction. Although the strength was improved with the other samples, the flexibility and elasticity were greatly reduced, which would result in the premature failure of a printing belt.

A further test was performed on the effect of aging on the physical properties of the product of the present invention. Table 6 shows the results of these tests using the process of the preferred embodiment. All aging was done at room temperature.

TABLE 6

|  | no aging | 7 days | 14 days | 1 year | 2 year |
|---|---|---|---|---|---|
| Hardness, durometer A | 90 | 90 | 90 | 90 | 90 |
| 100% Modulus, psi | 767 | 825 | 945 | 1,042 | 845 |
| 300% Modulus, psi | 1,315 | 1,475 | 1,570 | 1,690 | 1,408 |
| Tensile Strength, psi | 8,055 | 8,421 | 8,793 | 8,721 | 8,563 |
| Elongation at break, % | 710 | 680 | 644 | 675 | 700 |
| Tear Strength, Die C | 521 | 521 | 561 | 557 | 563 |
| Tear Strength, split | 342 | 326 | 348 | 326 | 351 |

The results of these tests show that there is very little, if any, degradation of the physical properties of the product of the present invention, even after a period of two years.

As the above tests have shown, the preferred ratio of 2,4 to 2,6 TDI is 88:12. While not being bound by any specific theory, it is believed that in the reaction between the TDI mixture and the PTMEG, the initial reaction is between the PTMEG and the 2,4 isomers exclusively. This is likely due to the proximity of the methyl group to both of the isocyanate groups in the 2,6 isomer. The activity of these groups is thus hindered.

Under such theory the reaction product solution contains prepolymer as shown in formula 5 and free 2,6 TDI. This 2,6 isomer is then available for reaction with the diamine curing agent to form short chain oligomers. This 2,6 TDI/diamine reaction product can then react with the NCO groups of the prepolymer and be included as part of the long chain of the final elastomer. It is believed that the combination of long chain polymers as shown in formula 6 with the short chain oligomers formed by the reaction between the free 2,6 TDI and the diamine curing agent as shown in formula 7 gives the final product an excellent balance of strength and flexibility.

In addition to the specific PTMEG described herein it should be understood that polyether containing only difunctional primary hydroxyl groups may also be used without departing from the spirit or scope of the present invention. It is also within the scope of this invention to use a difunctional primary hydroxyl polyester instead of the polyether. An example of such a polyester is caprolactone ethylene glycol which has the formula:

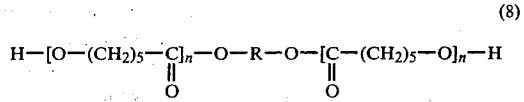

(8)

where n is selected so that the molecular weight of the resulting prepolymer is approximately 500 to 4,000 with 2,000 being preferred.

Ethylene adipates such as adipic acid ethylene glycol may also be used.

Modification of the present invention may also be made with respect to the method of preparation and reaction ratios disclosed herein. Further, the prepolymers and final reaction products of the present invention can be used in the production of many useful articles such as gears, rollers, cable potting compounds, liners, sheaves, tires and the like. This invention, therefore, is not to be limited to what is specifically shown and discussed herein.

I claim:

1. A process for making a urethane elastomer comprising the steps of:

reacting a mixture of approximately 1.5 to 2.5 equivalents of toluene diisocyanate consisting essentially of approximately 84 wt.% to 96 wt.% 2,4 toluene diisocyanate and 16 wt.% to 4 wt.% 2,6 toluene diisocyanate, with approximately 1 equivalent of a member selected from the group consisting of polyethers having difunctional primary hydroxyl groups, saturated difunctional primary hydroxyl polyesters, and mixtures thereof, to form a urethane prepolymer, said member having a molecular weight selected such that the molecular weight of the resulting urethane prepolymer is between about 500 and 4,000; and reacting approximately 1 equivalent of said prepolymer with approximately 1 equivalent of a diamine curing agent having the formula:

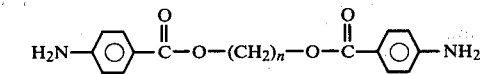

where n=2 through 6.

2. The process according to claim 1 wherein said member is polytetramethylene ether glycol.

3. The process according to claim 1 or 2 wherein said diamine curing agent has the formula:

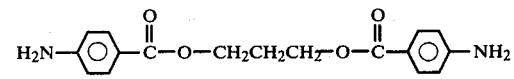

4. The process according to claim 3 wherein said toluene diisocyanate mixture comprises approximately 88 wt.% 2,4 toluene diisocyanate.

5. The process according to claim 4 wherein said toluene diisocyanate mixture is prepared by mixing 1.2 equivalents of a solution containing 80 wt.% 2,4 toluene diisocyanate and 20 wt.% 2,6 toluene diisocyanate, with 0.8 equivalents of 2,4 toluene diisocyanate.

6. The process according to claim 4 wherein said polytetramethylene ether glycol has a molecular weight of approximately 2,000.

7. The process according to claim 4 wherein said toluene diisocyanate mixture and said polytetramethylene ether glycol are reacted together for approximately 12 to 15 minutes at a temperature of approximately 184° F. to 187° F.

8. The process according to claim 1 wherein said member is poly(caprolactone) diol.

9. The process according to claim 1 wherein said member is a polyether.

10. The process according to claim 1 wherein said member is a polyester and said TDI mixture consists essentially of 65 wt.% to 75 wt.% 2,4 TDI and 35 wt.% to 25 wt.% 2,6 TDI.

11. A process for making a prepolymer for use in making a urethane elastomer comprising the steps of:
reacting a mixture of approximately 1.5 to 2.5 equivalents of toluene diisocyanate consisting of approximately 84 wt.% to 96 wt.% 2,4 toluene diisocyanate and 16 wt.% to 4 wt.% 2,6 toluene diisocyanate, with approximately 1 equivalent of a member selected from the group consisting of polyethers having difunctional primary hydroxyl groups, saturated difunctional primary hydroxyl polyesters, and mixtures thereof to form a urethane prepolymer, said member having a molecular weight selected such that the molecular weight of the resulting prepolymer is between about 500 and 4,000.

12. The process according to claim 11 wherein said member is polytetramethylene ether glycol.

13. The process according to claim 12 wherein said toluene diisocyanate mixture comprises approximately 88% 2,4 toluene diisocyanate.

14. The process according to claim 13 wherein said toluene diisocyanate mixture is prepared by mixing 1.2 equivalents of a mixture containing 80% 2,4 toluene diisocyanate and 20% 2,6 toluene diisocyanate, with 0.8 equivalents of pure 2,4 toluene diisocyanate.

15. The process according to claim 13 wherein said polytetramethylene ether glycol has a molecular weight of approximately 2,000.

16. The process according to claim 13 wherein said toluene diisocyanate mixture and said polytetramethylene ether glycol are reacted together for approximately 12 to 15 minutes at a temperature of approximately 184° F. to 187° F.

17. The process according to claim 11 wherein said member is caprolactone ethtylene glycol.

18. The process according to claim 11 wherein said member is a polyether.

19. A product produced according to the process of claim 11 or 12.

20. A product produced according to the process of claim 13 or 14.

* * * * *